United States Patent
Essex

[15] 3,700,038
[45] Oct. 24, 1972

[54] ADJUSTABLE SPRING TRIP SHANK ASSEMBLY

[72] Inventor: Duane Arnold Essex, Des Moines, Iowa

[73] Assignee: Deere & Company, Moline, Ill.

[22] Filed: March 3, 1971

[21] Appl. No.: 120,495

[52] U.S. Cl. .................. 172/265, 172/705, 248/15, 267/177
[51] Int. Cl. .............................................. A01b 61/04
[58] Field of Search ........ 267/177; 16/130, 158, 190; 248/15; 172/261, 264, 265, 307, 484, 497, 500, 657, 705–707, 710

[56] References Cited

UNITED STATES PATENTS 3,098,529  7/1963  Wade et al. ................. 172/710
3,608,851  9/1971  Anderson ..................... 248/15
3,480,086  11/1969  Groenke ..................... 172/710

*Primary Examiner*—Robert E. Pulfrey
*Assistant Examiner*—C. W. Hanor
*Attorney*—H. Vincent Harsha, Harold M. Knoth, William A. Murray, John M. Nolan and Raymond L. Hollister

[57] ABSTRACT

A self-restoring spring trip shank assembly of the type having a mounting element secured to a toolbar, a shank pivoted to the mounting element, and a spring acting between the mounting element and the shank to yieldably hold the shank in a working position. The spring acts on a multi-position reversible bracket secured to the shank so that by reversing the bracket the moment arm through which the spring force acts is varied and the force needed to pivot the shank upwardly is varied.

4 Claims, 5 Drawing Figures

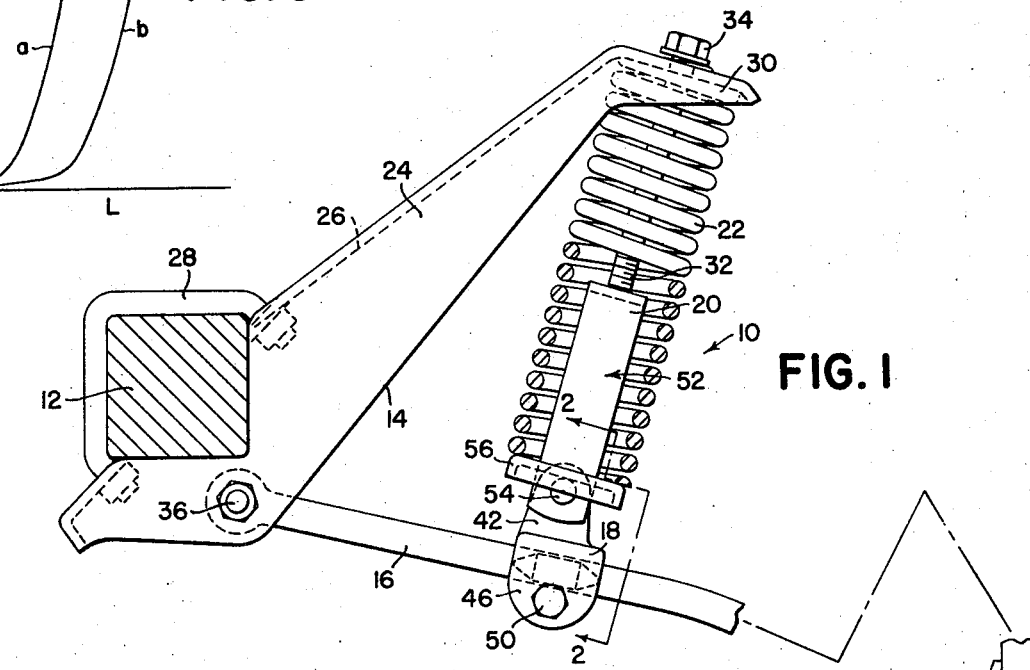
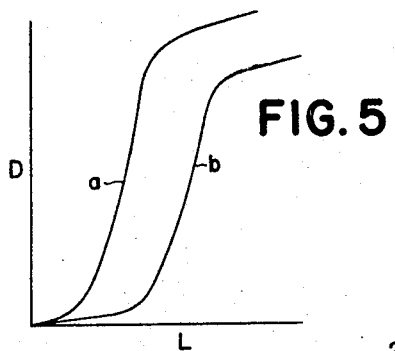
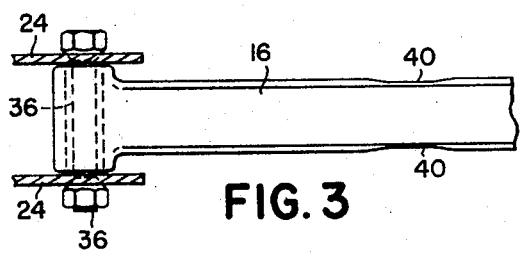
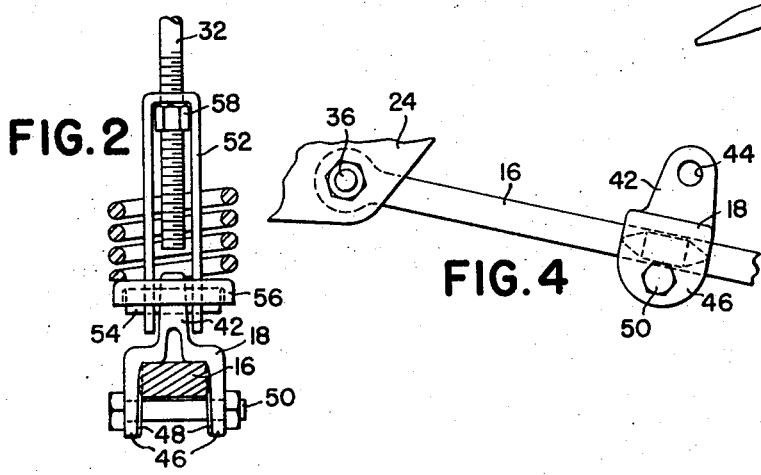

ADJUSTABLE SPRING TRIP SHANK ASSEMBLY

BACKGROUND OF THE INVENTION

The present invention relates generally to ground-working agricultural implements, and more particularly relates to a self-restoring spring trip shank assembly such as that used on field cultivators and chisel plows.

Earth-working implements in which the tool shank is yieldably held in working position by a spring force are generally well known and varying theories as to the optimum shank deflection force have been developed. One theory adheres to a relatively small shank deflection force since active shank action or a high frequency of vibration of the tool results in superior trash clearance and an easier pulling implement. A second theory favors a relatively large shank deflection force which provides a more aggressive action for the tool and holds the tool level until an obstruction is encountered.

SUMMARY OF THE INVENTION

The principal object of the invention is to provide a self-restoring spring trip shank assembly for earth-working tools in which the force required to deflect the shank can be varied.

A more specific object of the invention is to provide a self-restoring spring trip shank assembly for earth-working tools in which the moment arm through which the spring force acts to hold the shank in a working position can be varied so as to vary the force needed to deflect the shank upwardly.

Another object of the present invention is to provide a self-restoring spring trip shank assembly for earth-working tools in which the moment arm through which the spring force acts to retain the shank in a working position can be varied by the reversal of a spring bracket clamped to the shank.

The above objects and additional objects and advantages will become apparent to those skilled in the art from a reading of the following detailed description of a preferred embodiment of the invention when taken in conjunction with the accompanying drawing.

BRIEF DESCRIPTION OF THE DRAWING

In the drawing:

FIG. 1 is a side elevation view of a spring trip shank assembly constructed in accordance with the principles of the present invention;

FIG. 2 is a sectional view taken substantially along the line 2—2 of FIG. 1.

FIG. 3 is a top plan view of a portion of the shank illustrated in FIG. 2;

FIG. 4 is a side elevation view of a portion of the assembly illustrated in FIG. 1 and illustrating the bracket in its alternate position; and, FIG. 5 is a graphical representation of the load-deflection curves for the alternate positions of the bracket for the spring trip shank assembly.

DESCRIPTION OF THE PREFERRED EMBODIMENT

Referring now to the drawing, the spring trip shank assembly indicated generally by the numeral 10 is illustrated as being mounted on a toolbar or support element 12 and consists essentially of a mounting element 14, a shank 16, a clamp 18, a tension link 20 and a spring 22.

The mounting element 14 is formed as a channel member having legs 24 and a bight 26. A portion of the bight of the channel member has been removed near one end and the adjoining portion of the legs have been notched to receive the lower rear corner of the toolbar 12. The mounting element is retained in position on the toolbar 12 by a U-bolt 28 which extends around the toolbar 12 and through apertures provided in the bight 26.

The mounting element extends upwardly and rearwardly from the toolbar to an upper rear end portion 30 which extends rearwardly and slightly downwardly. The bight 26 of the upper rear end portion 30 of the mounting element 14 is apertured to receive a threaded rod 32 forming part of the tension link 20. The head 34 of the rod 32 engages the upper surface of the bight 26 of the upper rear end portion 30 of the mounting element, and the lower surface of the bight of the upper rear end portion of the mounting element provides a spring-abutting surface for the coil spring 22.

The shank 16 is mounted between the legs 24 of the forward portion of the mounting element 14 for vertical pivotal movement by a pivot bolt 36 and extends generally rearwardly and downwardly therefrom to a curved portion which terminates in a forwardly directed earth-working tool 38. The sides of the shank 16 are provided with relieved areas 40 which serve as a guide for the proper positioning of the clamp or bracket 18.

The clamp 18 is generally of inverted Y-shape when viewed in a fore-and-aft direction with an upwardly extending central leg 42 provided with an aperture 44 near its upper end and a pair of spaced, downwardly extending legs 46 provided with aligned apertures near their lower ends. The inner portions of the legs 46 are slightly bulged as at 48 and, when the clamp 18 is placed over the shank 16 with the legs 46 straddling the sides of the shank 16, the bulges 48 extend into the relieved areas 40 and prevent the clamp from sliding on the shank. A clamp bolt 50 extends through the aligned apertures in the legs 46 to clamp the legs 46 against the shank. When properly positioned on the shank 16, the clamp 18 is rearwardly of the pivot bolt 36 and below and slightly forwardly of the aperture provided in the upper rear end portion of the mounting element 14.

The lower end of the tension link consists of an inverted U-shaped anchor member 52 having an apertured bight through which the lower end of the threaded rod extends. The legs of the anchor member 52 are also apertured and secured to the clamp 18 by an anchor pin 54 which extends through the apertures in the legs of the anchor member 52 and through the aperture 44 provided in the central upwardly extending leg 42 of the clamp 18. The pin 54 is retained in a centered position in the aperture 44 by a washer 56 having a downwardly directed lip. The washer 56 is slidably mounted on the anchor member so that when lowered it prevents the legs of the anchor member from spreading and the lip extends along the ends of pin 54. A nut 58 on the lower end of the threaded rod 32 between the legs of the anchor member 52 serves to limit the lower position of the shank 16 and also to precompress the coil spring 22 which encircles the tension link 20 with its opposite ends bearing against the spring-abutting surface on the upper rear end of the mounting element and the washer 56. By bearing against the washer 56, the spring 22 retains the washer in its lower position.

For normal operation, the nut 52 is tightened a sufficient amount so as the point of abutment between the bottom of the washer 56 and the pin 54 is about a horizontal through the pivot bolt 36 so that upon upward deflection of the shank 16 the path of the point of abutment is upwardly and forwardly. The forward movement results in a decreasing lever or moment arm which cooperates with the increasing spring force to require a substantially constant or only slightly increasing force to move the shank upwardly.

When viewed from the side, the central, upwardly extending leg 42 of the clamp 18 is offset from the center of the clamp 18 in a fore-and-aft direction and the aperture 44 is centered in the leg 42 in the fore-and-aft direction so it also is offset from the center of the clamp. With the aperture offset, reversal of the clamp 18 on the shank 16, from the FIG. 1 position to the FIG. 2 position or vice versa, will vary the moment arm (the distance from the center of the pivot bolt 36 to the center of the pin 54) through which the force of the spring 22 acts to retain the shank 16 in its normal working position and will thus vary the action of the shank 16 and its associated tool 38.

When the offset aperture is in the forward position as in FIG. 1, the force needed to move the shank upwardly is relatively small as can be seen from curve "a" in FIG. 5 wherein the amount of deflection of the shank from its normal position is plotted on the axis of ordinates and the corresponding force on the tool 38 is plotted on the axis of abscissus. As can be seen from curve "a", a relatively small force on the tool 38 results in initial deflection of the shank. This provides high shank action or a high frequency of vibration of the tool which results in superior trash clearance on an easy pulling implement.

When the offset aperture is in the rear position as in FIG. 2, the force needed on the tool 38 to move the shank 16 upwardly is relatively high as can be seen from curve "b" in FIG. 5. The higher deflection force holds the tool level until an obstruction is encountered and thus gives a more aggressive action for the tool 38.

Although only a single embodiment of the invention has been described and illustrated, various modifications within the spirit and scope of the invention will be apparent to those skilled in the art and these obvious modifications can be made without departing from the underlying principles of the invention.

I claim:

1. A ground-working implement comprising: a support element; a mounting element having a lower forward end secured to the support element and extending upwardly and rearwardly therefrom to an upper rear end having a centrally apertured plate with a downwardly directed spring-abutting surface; a tool shank having a forward end connected to the lower forward end of the mounting element for vertical pivotal movement and extending rearwardly therefrom; a reversible bracket releasably secured to the shank rearwardly of the connection between the shank and mounting element and below the centrally apertured plate; the bracket having an upwardly directed apertured ear offset from the center of the bracket in a longitudinal direction; tension link means having an enlarged upper end abutting against the upper surface of the apertured plate and extending downwardly through the aperture to a lower end having a pair of spaced apertured legs positioned on opposite sides of the ear; a pin extending through the apertured legs and ear to secure the tension link means to the bracket; a washer having downwardly directed lip means slidably mounted on the lower end of the tension link means with the lip means extending alongside the ends of the pin to prevent displacement of the pin; and coil spring means encircling the tension link means and compressed between the spring-abutting face and the washer.

2. The implement set forth in claim 1 wherein the sides of the shank are provided with relieved areas to receive the bracket so that, upon reversal of the bracket, the bracket is secured to the shank in the exact same location.

3. The implement set forth in claim 2 wherein the bracket is of inverted Y-shape when viewed in a fore-and-aft direction, each leg is apertured in a lateral direction, the lower legs are positioned along the sides of the shank in the relieved areas, a clamp bolt extends through the apertures in the lower legs and clamps the legs against the sides of the shank, and the pin extends through the aperture in the upper leg.

4. A ground-working implement comprising: a support element; a mounting element having a lower forward end secured to the support element and extending upwardly and rearwardly therefrom to an upper rear end having a centrally apertured plate with a downwardly directed spring-abutting surface; a tool shank having a forward end connected directly to the lower forward end of the mounting element for vertical pivotal movement and extending generally rearwardly therefrom; a bracket-receiving relieved area provided in each side of the shank in a position rearwardly of the pivotal connection between the shank and mounting element and forwardly of the center of the apertured plate; a bracket having a pair of downwardly directed and laterally apertured legs mounted on the shank with the legs positioned along the sides of the shank in the relieved areas; a releasable clamp bolt extending through the apertures in the legs of the bracket clamping the legs of the bracket against the sides of the shank; the bracket having an upwardly directed ear offset from the center of the bracket in a longitudinal direction; laterally projecting abutment means carried by the ear; tension link means having an enlarged upper end abutting against the upper surface of the apertured plate and extending downwardly through the aperture to a lower end releasably secured to the laterally projecting abutment means; and coil spring means encircling the tension link means and compressed between the spring-abutting face and the laterally projecting abutment means; the parts being so arranged and constructed so that by reversing the bracket the ear will be offset in an opposite direction and the moment arm through which the force of the spring acts is varied with a resultant variation in the force needed to pivot the shank upwardly.

* * * * *